United States Patent
Watanabe (10) Patent No.: US 8,573,745 B2
(45) Date of Patent: Nov. 5, 2013

(54) SEALING MEMBER, LIQUID EJECTING HEAD, AND LIQUID EJECTING APPARATUS

(75) Inventor: Shunsuke Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 24 days.

(21) Appl. No.: 13/330,559

(22) Filed: Dec. 19, 2011

(65) Prior Publication Data

US 2012/0182351 A1  Jul. 19, 2012

(30) Foreign Application Priority Data

Jan. 14, 2011 (JP) ................................. 2011-006491

(51) Int. Cl.
*B41J 2/16* (2006.01)
(52) U.S. Cl.
USPC .......................................................... 347/47
(58) Field of Classification Search
USPC ............................... 347/40, 43, 47, 64–65, 68
See application file for complete search history.

(56) References Cited

U.S. PATENT DOCUMENTS

| 7,452,060 B2* | 11/2008 | Nakamura et al. ............. 347/71 |
| 8,205,964 B2* | 6/2012 | Saito ............................... 347/49 |
| 2010/0082199 A1 | 4/2010 | Ito |

FOREIGN PATENT DOCUMENTS

| JP | 2008-238752 A | 10/2008 |
| JP | 2009/214368 A | 9/2009 |
| JP | 2010079649 A | 4/2010 |

* cited by examiner

*Primary Examiner* — Lamson Nguyen
(74) *Attorney, Agent, or Firm* — Kilpatrick Townsend & Stockton LLP (57) ABSTRACT

A sealing member, disposed between a first member in which a first liquid flow channel is provided and a second member in which a second liquid flow channel that communicates with the first liquid flow channel is provided, includes: a plurality of communication openings; a reinforced portion in which the communication openings are provided; at least two first reference holes; a flexible portion, provided between the two first reference holes, that is weaker than the reinforced portion; and a second reference hole provided between the two first reference holes.

9 Claims, 10 Drawing Sheets

SEALING MEMBER, LIQUID EJECTING HEAD, AND LIQUID EJECTING APPARATUS

This application claims a priority to Japanese Patent Application No. 2011-006491 filed on Jan. 14, 2011 which is hereby expressly incorporated by reference herein in its entirety.

BACKGROUND

1. Technical Field

The present invention relates to sealing members, liquid ejecting heads, and liquid ejecting apparatuses.

2. Related Art

An ink jet recording head that ejects ink droplets can be given as a representative example of a liquid ejecting head that ejects liquid droplets. An ink jet recording head that, for example, includes a main head unit that ejects ink droplets from nozzle openings and a head holder, and in which is provided a sealing member that forms a seal between the respective flow channels in the main head unit and the head holder, has been proposed (for example, see JP-A-2008-238752, JP-A-2009-214368, and JP-A-2010-079649).

It is necessary for the sealing member to be positioned at a comparatively high level of precision between the main head unit and the head holder. Specifically, it is necessary for the communication openings of the sealing member to be positioned at a comparatively high level of precision relative to the liquid flow channels of the main head unit and the head holder. To position the sealing member at a high level of precision in such a manner, a reference hole into which a positioning pin is inserted is provided in the sealing member, and the positioning pin is positioned in the head holder or the main head unit, after which the sealing member is positioned relative to the head holder or the main head unit using the positioning pin; the direction of the sealing member in the horizontal plane is then fixed.

However, there is a problem in that the farther away the communication hole of the sealing member is from the reference hole, the positional precision of the sealing member and the precision with which the shape of the sealing member is maintained drops due to warping or the like of the sealing member, and thus the sealing member cannot be positioned relative to the other members with a high level of precision. If the communication opening of the sealing member then shifts from the liquid flow channels of the other members, the sealing property between the liquid flow channels that communicate with the communication opening drops, which can cause problems such as the risk of liquid leaks and the like occurring. In addition, if the communication opening shifts from the liquid flow channels, it is easier for bubbles to accumulate in the shifted sealing member; bubbles that have accumulated and grown may then be ejected from the nozzles, resulting in missing dots. Furthermore, as a result of the position of the communication opening shifting, there is a risk that the flow channel resistance of the liquid that flows within the liquid flow channel will change, leading to ejection malfunctions.

Further still, it is necessary to stretch the sealing member, which is provided with a plurality of communication openings, when positioning the respective communication openings, and at this time, the same problem as mentioned earlier will arise due to the communication openings deforming due to the stretching of the sealing member, the positions of the communication holes shifting from the positioning pins (reference holes), and so on.

It should be noted that these problems are not limited to ink jet recording heads, and are also present in other liquid ejecting apparatuses that eject liquids aside from ink. Furthermore, these problems are not limited to sealing members used in ink jet recording heads, and are also generally present in sealing members that are interposed between any given members.

SUMMARY

It is an advantage of some aspects of the invention to provide a sealing member, a liquid ejecting head, and a liquid ejecting apparatus that sufficiently achieve both positioning accuracy and a strong seal for the sealing member.

A sealing member according to an aspect of the invention is disposed between a first member in which a first liquid flow channel is provided and a second member in which a second liquid flow channel that communicates with the first liquid flow channel is provided, and includes: a plurality of communication openings; a reinforced portion in which the communication openings are provided; at least two first reference holes; a flexible portion, provided between the two first reference holes, that is weaker than the reinforced portion; and a second reference hole provided between the two first reference holes.

According to this aspect, the plurality of communication openings can be positioned using the two first reference holes; furthermore, positional shifting caused by the tolerance of the reference pins that are inserted into the two first reference holes can be absorbed by the flexible portion stretching, which makes it possible to suppress the reinforced portion from stretching, suppress the deformation and positional shifting of the communication openings, and in turn makes it possible to position the communication openings with a high degree of precision. In addition, by providing the second reference hole between the two first reference holes, it is possible to suppress positional shifting of the communication openings caused by the area of the sealing member between the two first reference holes bending; this makes it possible to position the communication openings with a high degree of precision.

Here, it is preferable for the communication openings to be provided between the two first reference holes. According to this aspect, it is possible to position the communication openings provided between the two first reference holes with a high degree of precision.

In addition, it is preferable for the first reference holes to be provided for each of the communication openings. According to this aspect, it is possible to position the communication openings with a high degree of precision using the first reference holes.

In addition, it is preferable for the second reference hole to be provided in the flexible portion. According to this aspect, the cross-sectional surface area of the flexible portion is further reduced by the second reference hole, which makes it easier for the flexible portion to stretch.

In addition, it is preferable for the communication openings to be disposed upon a straight line that connects the two first reference holes. According to this aspect, it is particularly possible to position the communication openings provided upon a straight line that connects the two first reference holes with a high degree of precision.

In addition, it is preferable for the second reference hole to be disposed upon a straight line that connects the two first reference holes. According to this aspect, it is possible to effectively suppress positional shifting by the second reference hole.

In addition, it is preferable for the diameter of the first reference holes to be less than or equal to the maximum diameter of reference pins inserted into the first reference holes. According to this aspect, it is possible to suppress positional shifting caused by gaps between the reference pins and the first reference holes.

A liquid ejecting head according to another aspect of the invention includes: a main liquid ejecting head unit, in which is formed a first liquid flow channel through which a liquid flows, that ejects the liquid from a nozzle opening using a pressurizing unit; a head holder including a second liquid flow channel, one end of the second liquid flow channel communicating with a reservoir member that holds the liquid and the other end of the second liquid flow channel communicating with the first liquid flow channel; and a sealing member disposed between the main liquid ejecting head unit and the head holder. Here, the sealing member has: a plurality of communication openings; a reinforced portion in which the communication openings are provided; at least two first reference holes; a flexible portion, provided between the two first reference holes, that is weaker than the reinforced portion; and a second reference hole provided between the two first reference holes.

According to this aspect, the plurality of communication openings can be positioned using the two first reference holes; furthermore, positional shifting caused by the tolerance of the reference pins (the main head unit, the head holder, and so on) that are inserted into the two first reference holes can be absorbed by the flexible portion stretching, which makes it possible to suppress the reinforced portion from stretching, suppress the deformation and positional shifting of the communication openings, and in turn makes it possible to position the communication openings with a high degree of precision. In addition, by providing the second reference hole between the two first reference holes, it is possible to suppress positional shifting of the communication openings caused by the area of the sealing member between the two first reference holes bending; this makes it possible to position the communication openings with a high degree of precision.

In addition, another aspect of the invention is a liquid ejecting apparatus including the liquid ejecting head according to the aforementioned aspect.

According to this aspect, it is possible to realize a highly-reliable liquid ejecting apparatus that suppresses liquid leaks, problems of ejecting liquid droplets malfunctions, and so on.

BRIEF DESCRIPTION OF THE DRAWINGS

The invention will be described with reference to the accompanying drawings, wherein like numbers reference like elements.

DESCRIPTION OF EXEMPLARY EMBODIMENTS

The invention will be described in detail hereinafter based on embodiments.

First Embodiment

Figure 1:
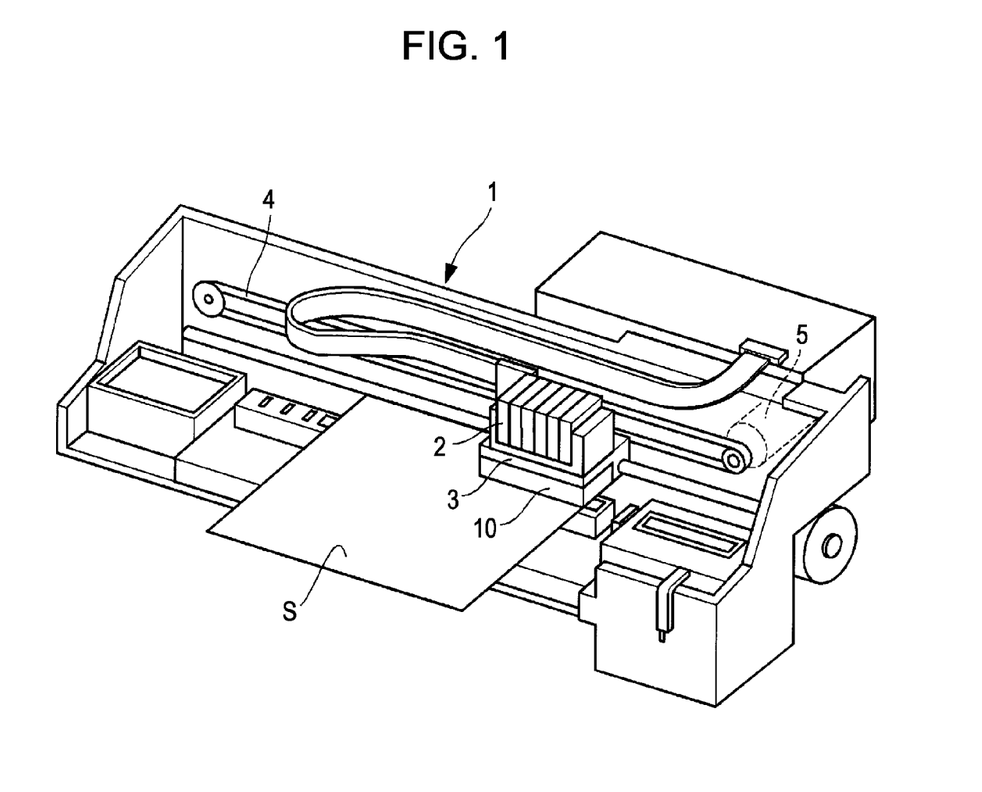
FIG. 1 is a schematic diagram illustrating a liquid ejecting apparatus according to a first embodiment of the invention.

An ink jet recording apparatus will be described based on FIG. 1. As illustrated in FIG. 1, an ink jet recording apparatus 1 serving as a liquid ejecting apparatus includes an ink jet recording head (called simply a "head" hereinafter) 10 serving as a liquid ejecting head. The head 10 is anchored to a carriage 3 in which an ink cartridge 2 is mounted. The carriage 3 has a box shape whose upper portion is open, and is attached so that a nozzle surface of the head 10 is exposed on the surface of the carriage 3 that faces recording paper S (that is, the bottom surface); the ink cartridge 2, which is a reservoir member, is housed within the carriage 3. Ink from the ink cartridge 2 is supplied to the head 10.

The carriage 3 is connected to a stepping motor 5 via a timing belt 4, and moves back and forth in the paper width direction of the recording paper S (that is, in the main scanning direction). Through this, ink droplets are ejected onto the top surface of the recording paper S while moving the carriage 3, thus printing images, text, or the like on the recording paper S as a dot matrix.

Note that the example shown in FIG. 1 illustrates an example in which the ink cartridge 2, which is a reservoir member, is held in the carriage 3 as a liquid source, but the invention can also be applied in the case of an ink jet recording apparatus configured so that the ink cartridge 2, which is a reservoir member, is held in a different location than the carriage 3 and the ink is pressure-transferred to a flow channel formation portion of the head 10 via a supply pipe.

Figure 2:
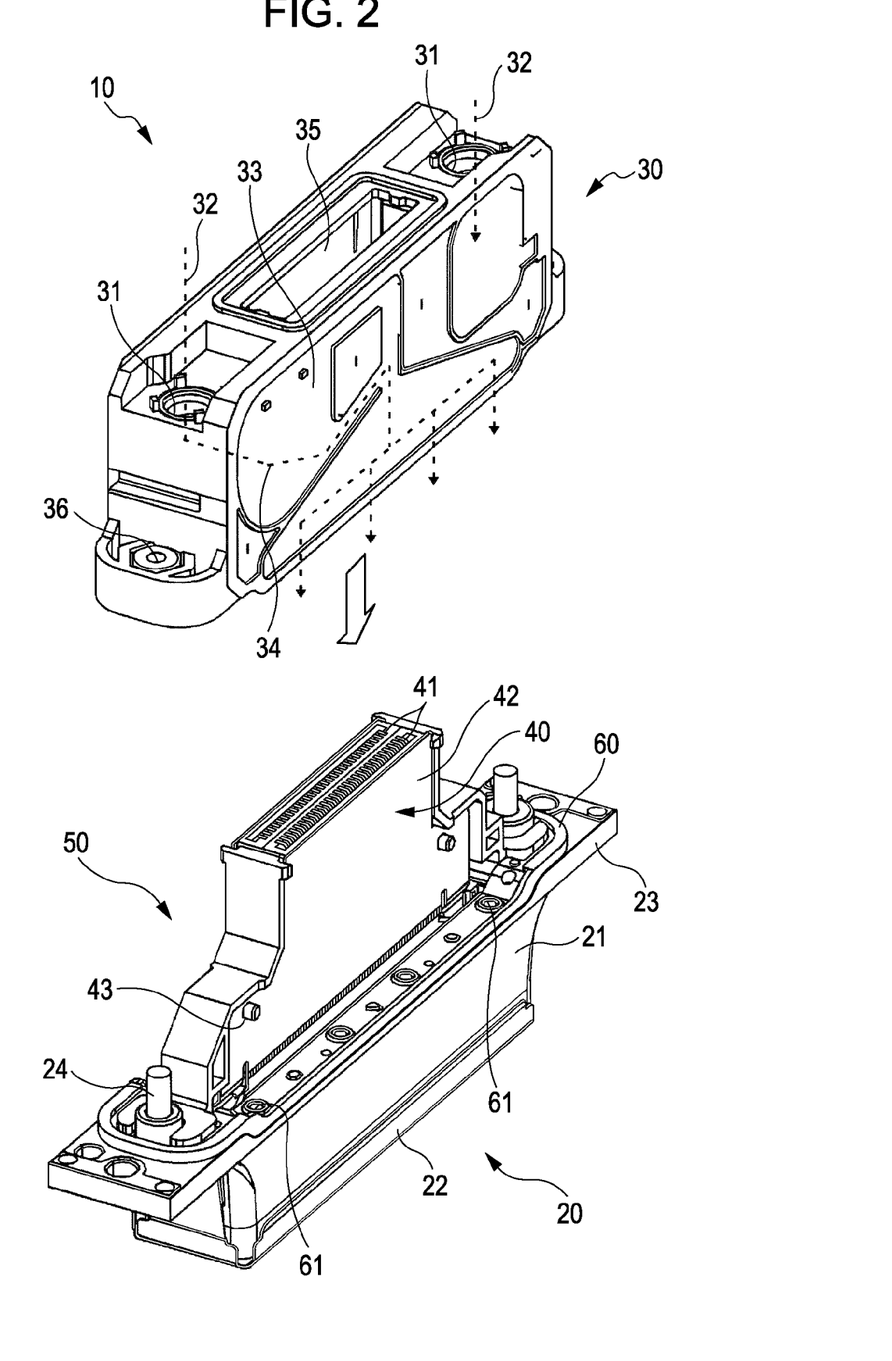
FIG. 2 is an exploded perspective view illustrating a head according to the first embodiment of the invention.
Figure 3:
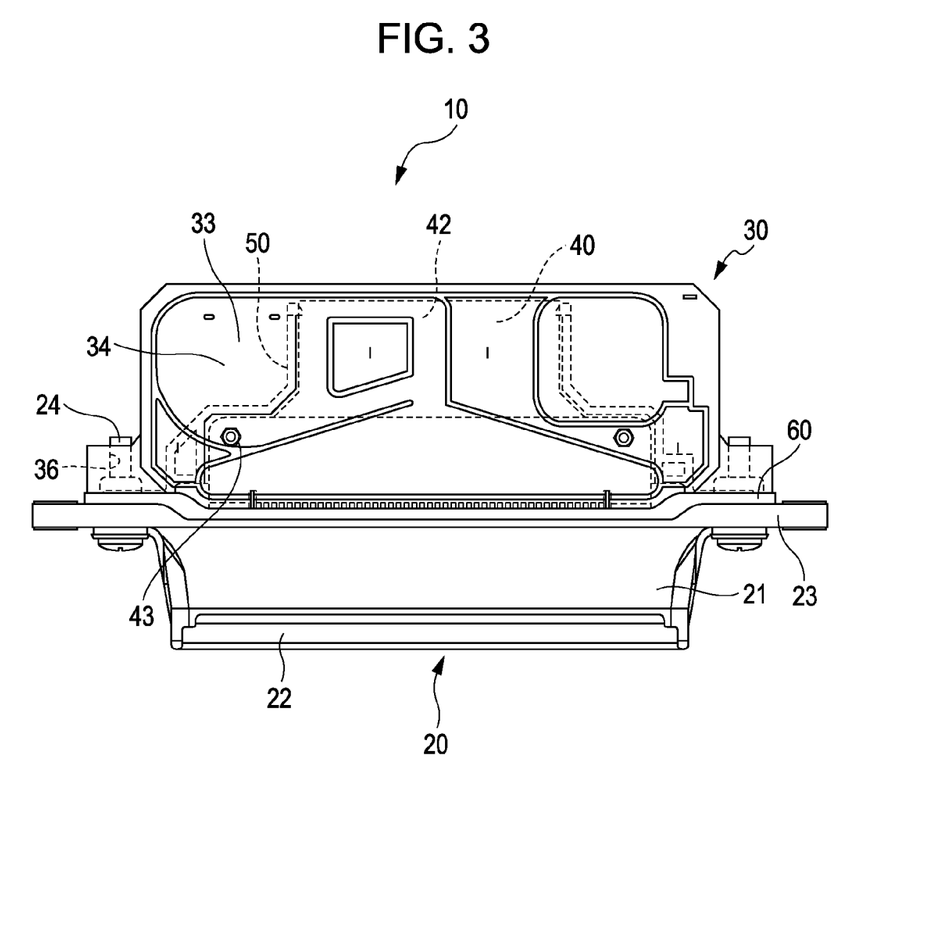
FIG. 3 is a front view of the head according to the first embodiment of the invention.

The head 10 will now be described using FIGS. 2 and 3. The head 10 includes a main head unit 20, which serves as a first member according to this embodiment, and a self-sealing unit 30, which is a head holder (a second member) for introducing ink from the ink cartridge 2 (see FIG. 1) into the head 10.

The main head unit 20 includes a head case 21, and a head cover 22 that protects the bottom end surface of the main head unit 20 is provided in the head case 21. An opening (not shown) that exposes nozzle openings (described later) is formed in the head cover 22.

Figure 4:
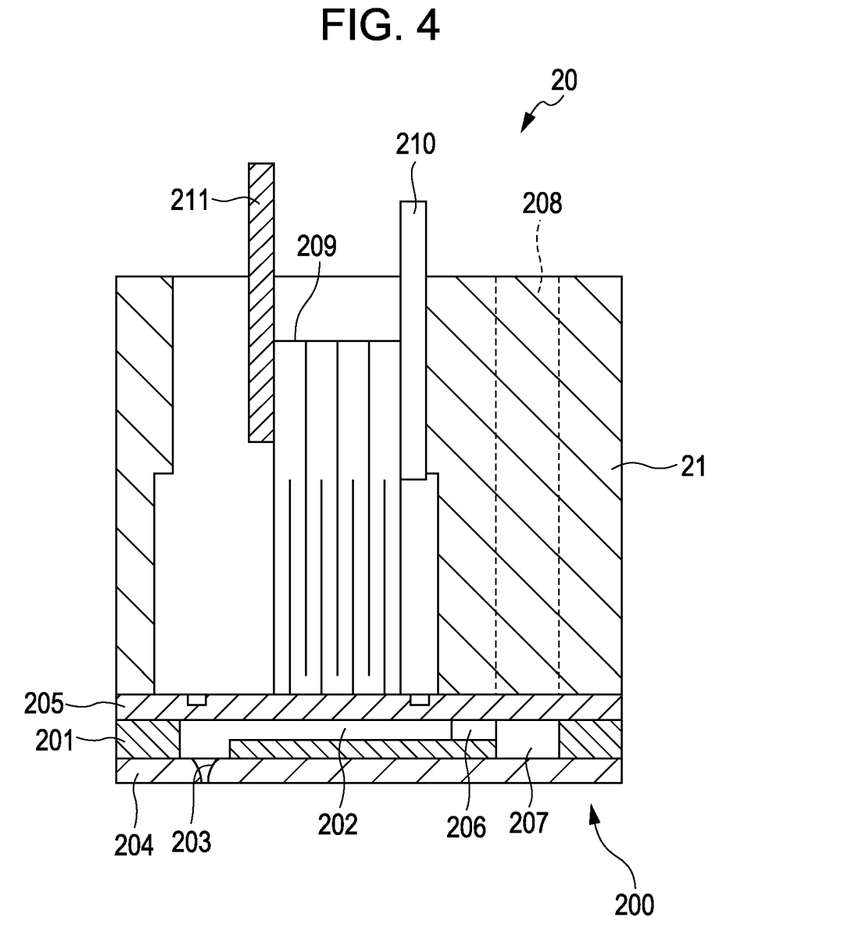
FIG. 4 is a cross-section of a main head unit according to the first embodiment of the invention.

The main head unit 20 will now be described using FIG. 4. A flow channel formation portion 200 is provided in the lower end of the head case 21 of the main head unit 20. The flow channel formation portion 200 includes a flow channel plate 201. Specifically, a plurality of pressure generation chambers 202 are arranged in parallel in the flow channel plate 201. The surface on one side of the flow channel plate 201 is sealed by a nozzle plate 204 having nozzle openings 203 corresponding to respective pressure generation chambers 202. Meanwhile, the surface on the other side of the flow channel plate 201 is sealed by a vibration plate 205. The nozzle openings 203 formed in the nozzle plate 204 are arranged in a row in the lengthwise direction (that is, the arrangement direction of the pressure generation chambers 202) in the bottom end surface of the main head unit 20. Furthermore, a manifold 207, serving as a common ink chamber for the plurality of pressure generation chambers 202, is formed in the flow channel plate 201 so as to communicate with each of the pressure generation chambers 202 via an ink communication channel 206. A head case flow channel 208 provided in the head case 21 communicates with the manifold 207. Ink is supplied to the manifold 207 from the self-sealing unit 30 (see FIG. 2) via this head case flow channel 208. In this embodiment, a first liquid flow channel that includes the pressure generation chambers 202, the ink communication channel 206, the manifold 207, and the head case flow channel 208 is provided in the main head unit 20.

Meanwhile, piezoelectric elements 209, serving as pressurizing units, are provided in the vibration plate 205 on the side opposite to the pressure generation chambers 202, with the ends of each piezoelectric element 209 making contact with a region corresponding to a respective pressure generation chamber 202. These piezoelectric elements 209 are configured by layering a piezoelectric material vertically between alternating layers of electrode-forming materials in a sandwich-like shape, and a non-volatile region that does not contribute to vibrations is anchored to an anchor plate 210. Meanwhile, a wiring member 211 is connected to a respective piezoelectric element 209, and a driving signal is inputted into an electrode of the piezoelectric element 209 formed of the electrode-forming material from this wiring member 211.

With the ink jet recording head 10 configured in this manner, ink is supplied to the manifold 207 via the head case flow channel 208 that communicates with the self-sealing unit 30, thus ink being distributed to the pressure generation chambers 202. To explain this in more detail, the piezoelectric element 209 constricts as a result of the application of the driving signal from the wiring member 211 thereto. As a result, the vibration plate 205 deforms along with the piezoelectric elements 209 (in FIG. 4, raised in the upward direction), causing the capacity of the pressure generation chambers 202 to increase, thereby pulling ink into the pressure generation chambers 202. After ink has filled the chambers up to the nozzle openings 203, the voltage applied to the piezoelectric elements 209 is removed based on the driving signal, causing the piezoelectric elements 209 to extend and return to their original states. Through this, the vibration plate 205 is also displaced and returns to its original state, thereby causing the pressure generation chambers 202 to shrink, increasing the internal pressure thereof and discharging ink droplets through the nozzle openings 203 as a result. In other words, in this embodiment, longitudinally-vibrating piezoelectric elements 209 are provided as pressurizing units causing a change in the pressure of the pressure generation chambers 202.

Returning to FIGS. 2 and 3, a flange portion 23 is formed on the upper surface side of the main head unit 20, or in other words, on the side opposite to the bottom surface on which the head cover 22 that covers the nozzle plate is provided. The head 10 includes an FPC (Flexible Print Cable) 40 serving as a driving board upon this flange portion 23.

The FPC 40 is a film-form driving board that can be bent. In this embodiment, the FPC 40 is bent and held erect relative to the flange portion 23 by a holding member 50. The holding member 50 is provided upright on the flange portion 23 of the main head unit 20.

The FPC 40 includes connectors 41 for connecting to an external wiring member (not shown) from a main printer unit.

The FPC 40 also includes a board terminal portion (not shown) for sending signals to the aforementioned piezoelectric elements, and the wiring member 211 (see FIG. 4) connected to each piezoelectric element is electrically connected to this board terminal portion using solder or the like. In other words, the FPC 40 is configured to receive a driving signal from the main printer unit through a printer cable connected to the connectors 41 and supply that driving signal to the piezoelectric elements 209 through the wiring member 211 connected to the board terminal portion.

The self-sealing unit 30 is provided on the top of the flange portion 23 of the main head unit 20. The self-sealing unit 30 has a rectangular block shape having a rectangular panel; ink introduction holes 31 are provided at the ends of the upper portion thereof, and ink is supplied from the ink cartridge 2 (see FIG. 1) into the respective ink introduction holes 31. The ink supplied into one of the ink introduction holes 31 (on the left in FIG. 2) passes through a unit flow channel 32 (indicated by a dotted line in FIG. 2) provided within the self-sealing unit 30 and is sent to a main flow channel 33 provided in the panel surface of the self-sealing unit 30, whereas the ink supplied into the other of the ink introduction holes 31 (on the right in FIG. 2) passes through the unit flow channel 32 and is sent to a main flow channel 33 provided on the rear side as viewed from the perspective in FIG. 2. In other words, in the self-sealing unit 30 according to this embodiment, two unit flow channels 32 are provided in a symmetrical manner. Ink that has flowed through this main flow channel 33 is sent from the outer side of the panel surface to a lower portion on the inner side of the self-sealing unit 30, and is then sent to the head case flow channel 208 (see FIG. 4) from four discharge holes (not shown) via communication openings 61 of a sealing member 60. In this embodiment, a second liquid flow channel that includes the unit flow channels 32 and the main flow channels 33 is provided in the self-sealing unit 30. Note that in this embodiment, four discharge holes are provided for each main flow channel 33, and therefore a total of eight discharge holes are provided in the self-sealing unit 30.

Furthermore, valves (not shown) are provided in the unit flow channels 32 between the respective ink introduction holes 31 and entry portions 34 of the main flow channels 33, the valves operate so as to allow the flow of ink when the pressure in the manifold of the main head unit 20 drops, or in other words, when ink is ejected and the pressure in the main flow channel 33 has become relatively lower. In the case where ink is being supplied from the ink introduction holes 31 at a predetermined pressure, or in other words, the case where ink has accumulated within the manifold of the main head unit 20, the valve is put into a closed state, and when the pressure in the anterior areas drops due to the ejection of ink, the valve is put into an open state due to the negative pressure generated thereby, and the ink is supplied to the main head unit 20.

An FPC passage portion 35 is formed in the central area of the self-sealing unit 30. The FPC passage portion 35 is a cavity whose top and bottom are open, and is configured so as to house the FPC 40 held by the holding member 50. When the FPC 40 is housed in the FPC passage portion 35, the connectors 41 of the FPC 40 face the upper opening of the FPC passage portion 35.

In the case where the self-sealing unit 30 is to be installed in the main head unit 20, positioning pins 24 provided in the main head unit 20 are inserted into positioning holes 36 provided on the right and left surface sides of the self-sealing unit 30, thus performing the positioning. Note that the positioning pins 24 are bolts provided in the bottom surface of the flange portion 23 of the main head unit 20, and the self-sealing unit 30 is anchored to and installed in the main head unit 20 by inserting the positioning pins 24 into the positioning holes 36.

Furthermore, the head 10 includes the sealing member 60 between the main head unit 20 and the self-sealing unit 30. In this embodiment, the self-sealing unit 30 corresponds to a head holder.

In the case where the self-sealing unit 30 is installed in the main head unit 20, the sealing member 60 is installed between the main head unit 20 and the self-sealing unit 30, and serves to ensure the seal between the openings of the head case flow channel 208 formed in the main head unit 20 and the discharge holes within the self-sealing unit 30. In other words, a favorable seal is made by the sealing member 60 at the area where the openings of the head case flow channel 208 and the discharge holes within the self-sealing unit 30 are connected. The communication openings 61 that pass into and communicate with the openings of the head case flow channel 208 and the discharge holes within the self-sealing unit 30 are provided in the sealing member 60.

As described earlier, the sealing member 60 is interposed between the main head unit 20 and the self-sealing unit 30, and thus a favorable seal is ensured by the sealing member 60 at the area where the first liquid flow channel and the second liquid flow channel are connected, or more specifically, between the openings of the head case flow channel 208 and the discharge holes of the self-sealing unit 30. More specifically, in this embodiment, the sealing member 60 is sandwiched between a protruding portion in which the discharge holes within the self-sealing unit 30 are provided and a protruding portion in which the head case flow channel 208 provided in the main head unit 20 are provided, tightly sealing the area where the openings of the head case flow channel 208 and the discharge holes of the self-sealing unit 30 are connected and preventing ink from leaking from this connection area.

Figure 5:
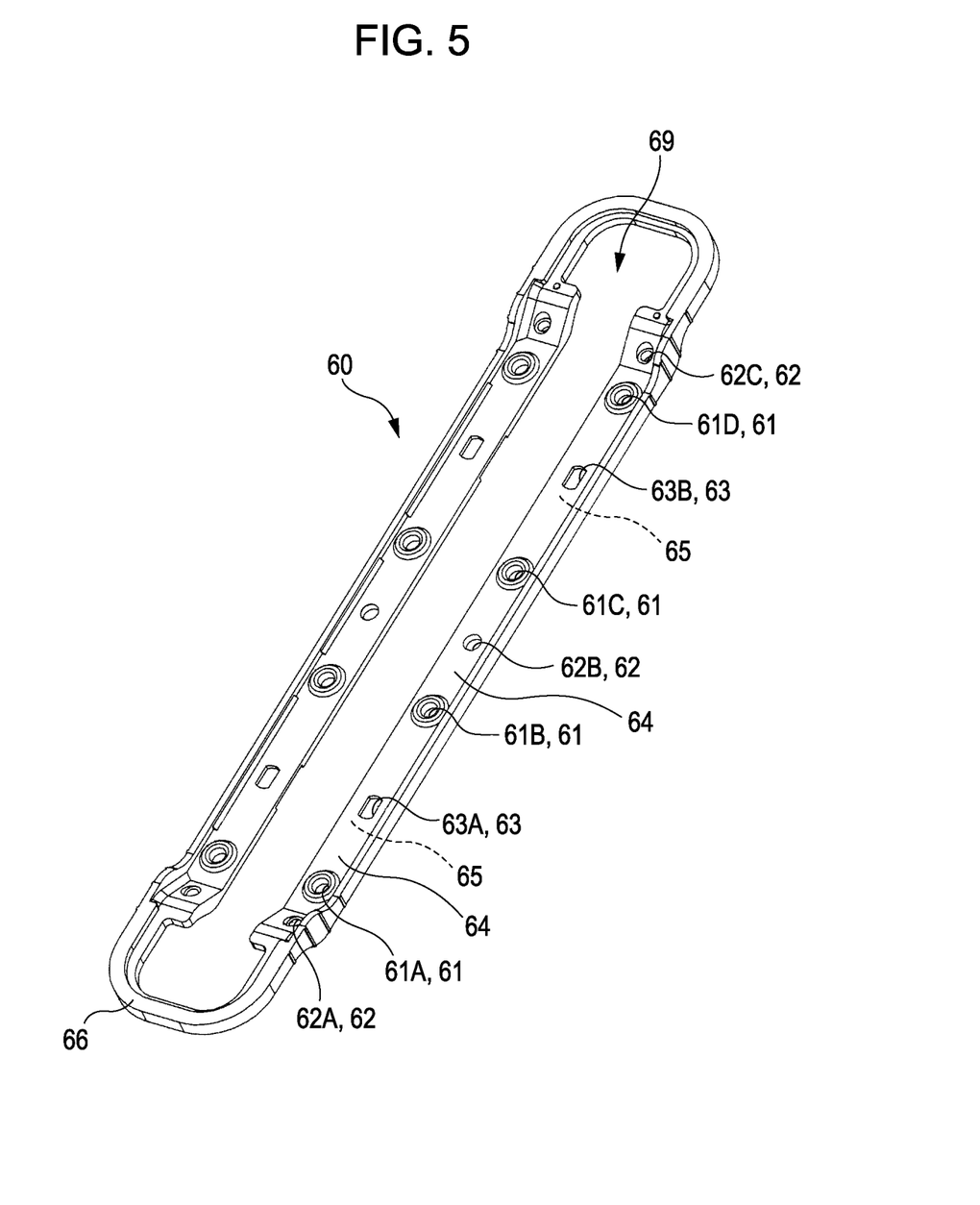
FIG. 5 is a perspective view illustrating a sealing member according to the first embodiment of the invention.
Figure 6:
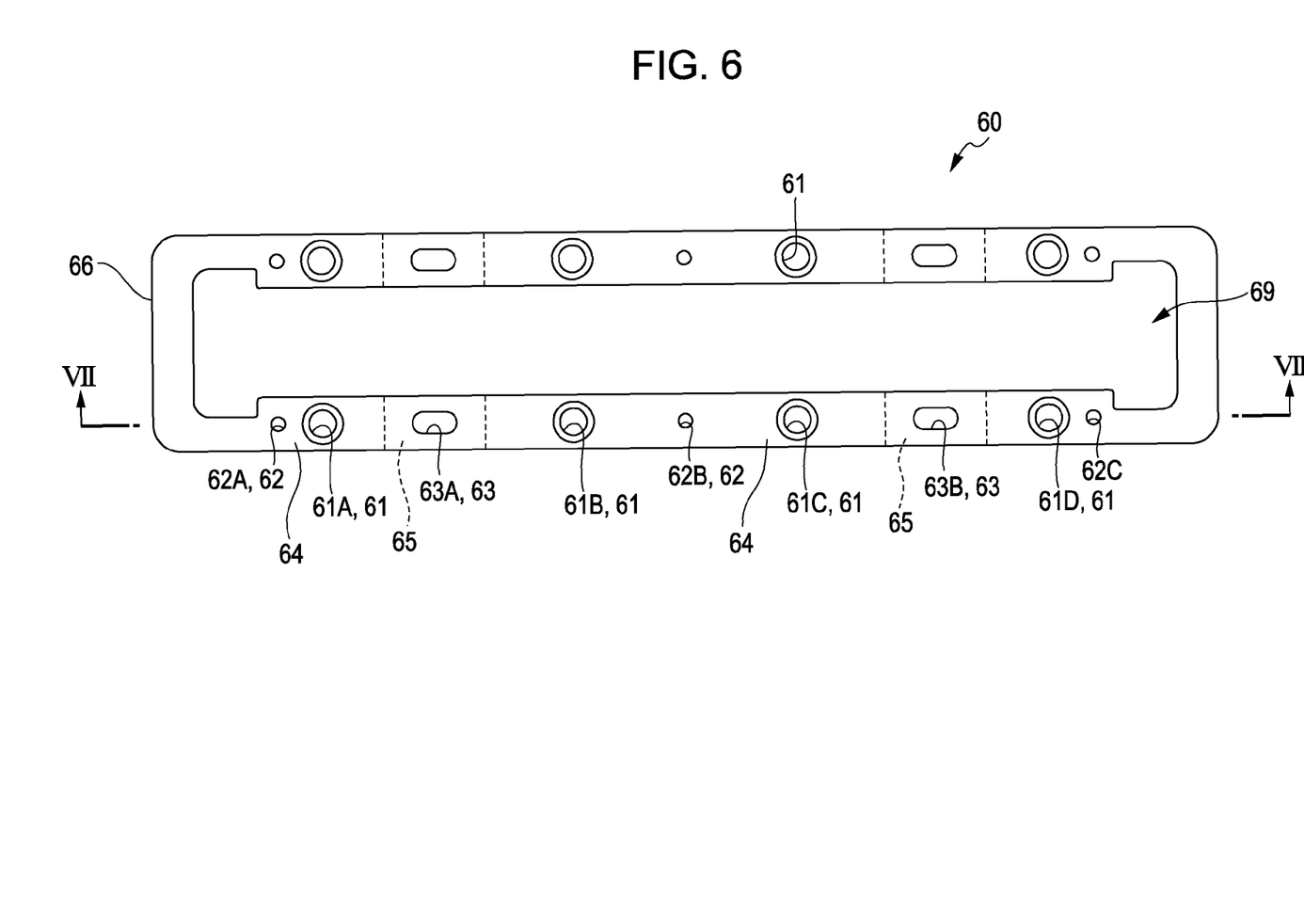
FIG. 6 is a plan view illustrating the sealing member according to the first embodiment of the invention.
Figure 7:
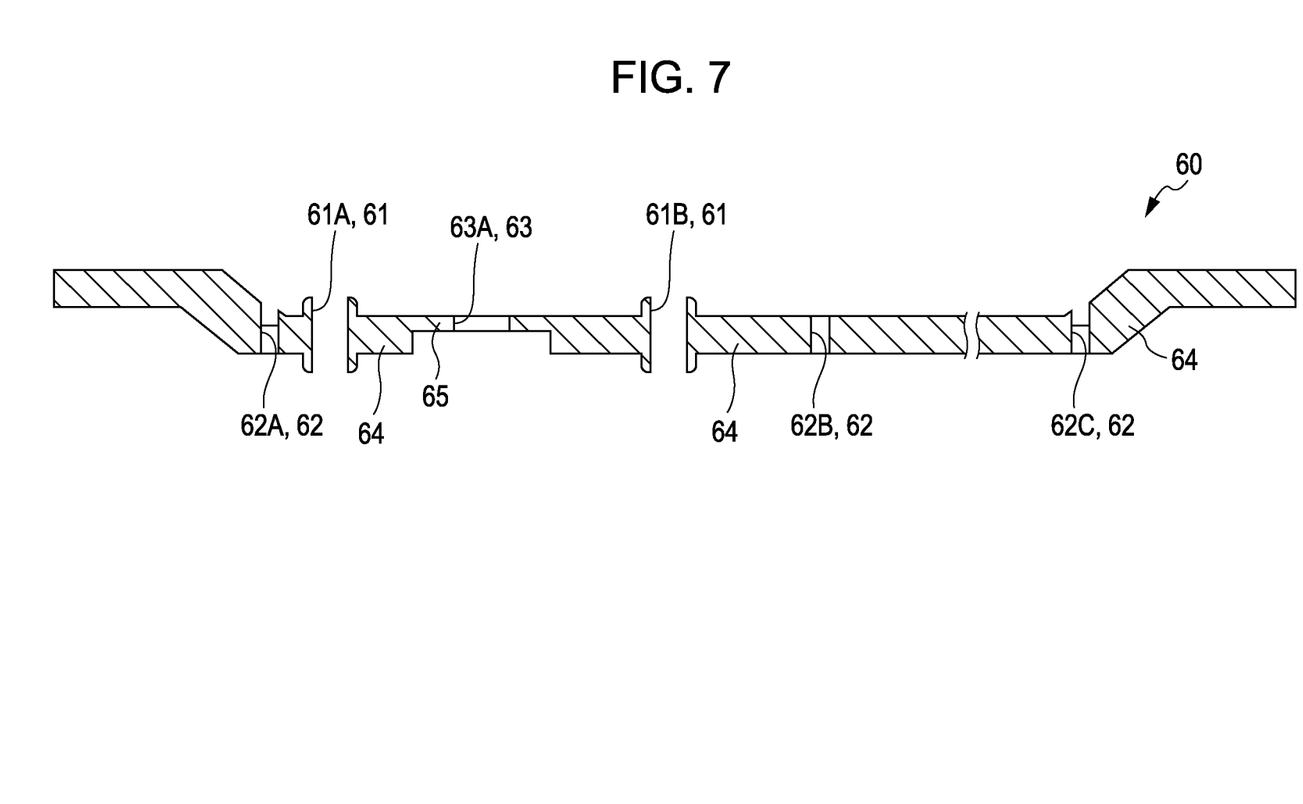
FIG. 7 is a cross-sectional view illustrating the sealing member according to the first embodiment of the invention.
Figure 8A:
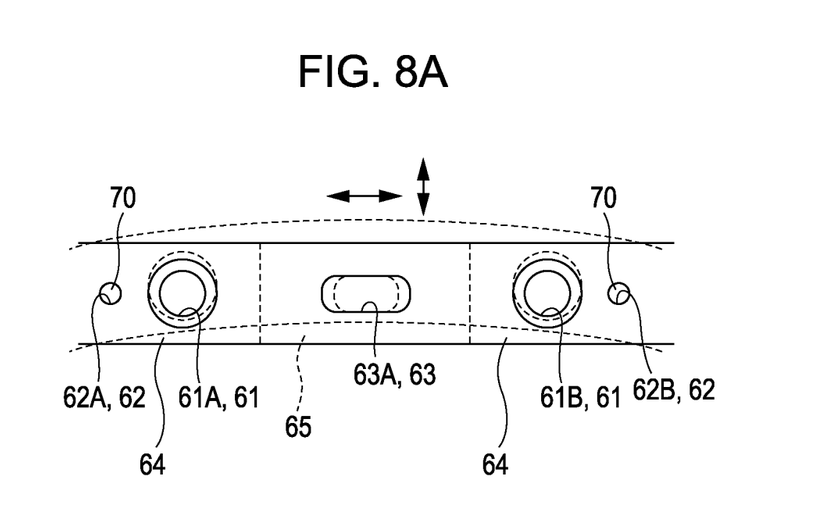
FIGS. 8A and 8B are plan views of the sealing member, illustrating a positioned state, according to the first embodiment of the invention.
Figure 8B:
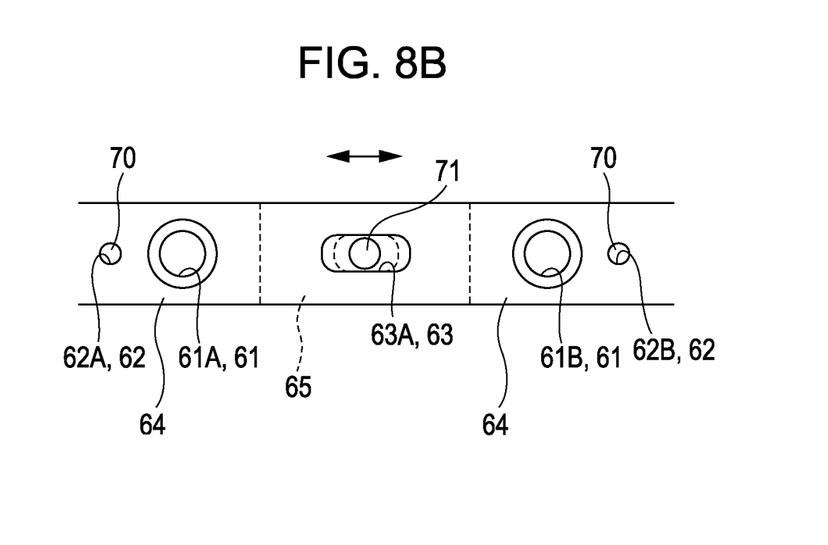
Figure 9:
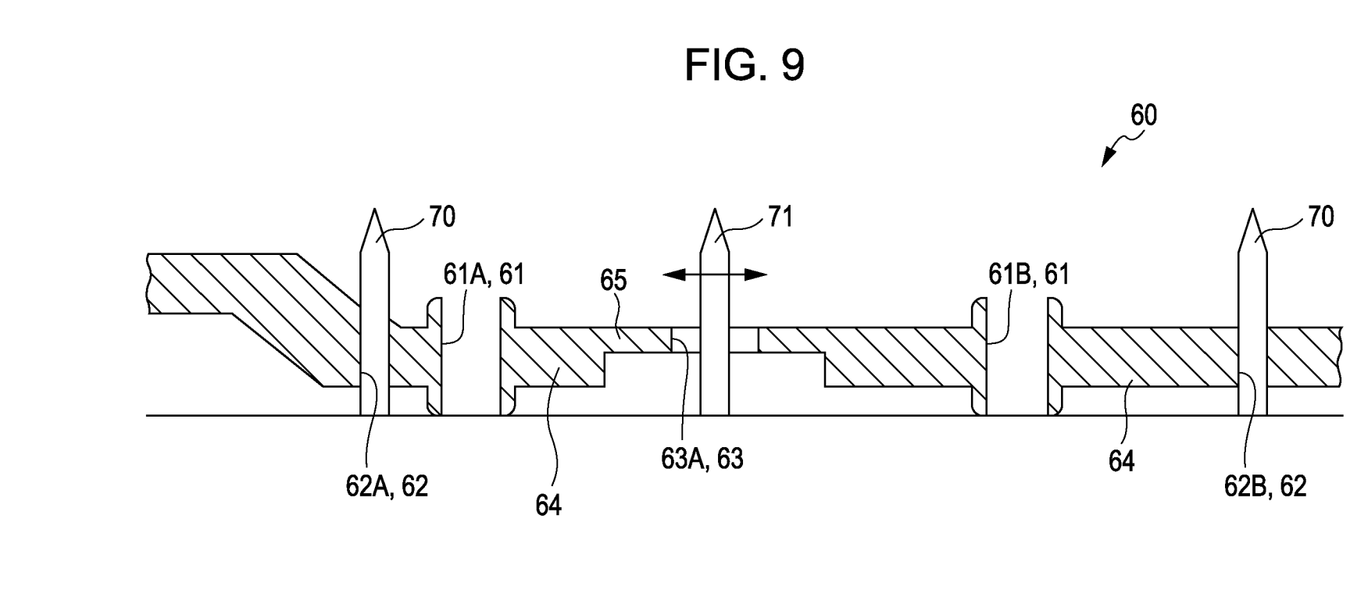
FIG. 9 is a cross-sectional view of the sealing member, illustrating a positioned state, according to the first embodiment of the invention.

The sealing member 60 according to this embodiment will now be described using FIGS. 5 to 9. FIG. 5 is a perspective view illustrating the sealing member; FIG. 6 is a plan view illustrating the sealing member; FIG. 7 is a cross-sectional view taken along the VII-VII line shown in FIG. 6; FIGS. 8A and 8B are plan views illustrating a state in which positioning has been carried out using reference pins; and FIG. 9 is a cross-sectional view illustrating a state in which positioning has been carried out using reference pins.

As shown in the drawings, the sealing member 60 is a plate-shaped member that has an opening 69 into which the main head unit 20 is inserted. In this embodiment, the FPC 40 of the main head unit 20 and the holding member 50 thereof are inserted into the opening 69 of the sealing member 60, as shown in FIG. 2.

Four of the communication openings 61 that pass through in the thickness direction are provided along the lengthwise direction, on both sides of the sealing member 60 in the widthwise direction thereof, with the opening 69 in the middle. These communication openings 61 are provided in positions that correspond to the openings in the head case flow channel 208 and the discharge holes in the self-sealing unit 30.

With respect to the details of the sealing member 60, this embodiment will describe only the long portions on one side of the sealing member 60 in the widthwise direction thereof that has the opening 69 in the middle; however, because the sealing member 60 has a ring-shape obtained by connecting two of the long portions on both sides in the lengthwise direction thereof, both sides of the sealing member 60 in the widthwise direction thereof with the opening 69 in the middle have approximately the same shape, and thus redundant descriptions will be omitted.

First reference holes 62 (62A-62C) and second reference holes 63 (63A, 63B), serving as a plurality of reference holes, are provided on one side (that is, in one of the long portions) in the widthwise direction of the sealing member 60 with the opening 69 in the middle thereof.

The first reference holes 62 (62A-62C) are provided so as to correspond to respective communication openings 61 (61A-61D). Note that in this embodiment, the first reference hole 62A and the first reference hole 62B are combined, and the first reference hole 62B and the first reference hole 62C are combined. In other words, the first reference hole 62B provided in the center is shared by the two communication openings 61B and 61C in the center side of one of the long portions. Although details will be given later, this is for combining the first reference hole 62A and the first reference hole 62B and positioning these holes with the communication openings 61A and 61B, and for combining the first reference hole 62B and the first reference hole 62C and positioning these holes with the communication openings 61C and 61D. Note that it is preferable for the two combinations of first reference holes 62 to be first reference holes 62 that are adjacent to each other. Of course, the first reference hole 62A and the first reference hole 62B may be combined.

Note that the first reference holes 62 (62A-62C) provided corresponding to the respective communication openings 61 (61A-61D) are provided so as to be near the respective communication openings 61 (61A-61D). In addition, in this embodiment, the communication openings 61 are provided between two first reference holes 62. Specifically, the communication openings 61A and 61B are disposed between the combination of the two first reference holes 62A and 62B. Likewise, the communication openings 61C and 61D are disposed between the combination of the two first reference holes 62B and 62C. In addition, in this embodiment, the communication openings 61A and 61B are provided upon a straight line that connects the combination of the two first reference hole 62A and the first reference hole 62B. Likewise, the communication openings 61C and 61D are provided upon a straight line that connects the first reference hole 62B and the first reference hole 62C. In other words, in this embodiment, the communication openings 61 (61A-61D) and the first reference holes 62 (62A-62C) are disposed upon a straight line within a single long portion, the long portion being on one side in the widthwise direction that has the opening 69 in the middle.

These first reference holes 62 have a diameter that is less than or equal to the maximum diameter of reference pins 70 (see FIG. 9) that are inserted thereinto. As a result, the gap between the first reference holes 62 and the reference pins 70 inserted thereinto can be reduced (that is, set to zero), which makes it possible to position the communication openings 61 with a high degree of precision by inserting the reference pins 70 into the first reference holes 62.

Meanwhile, the second reference holes 63 are provided between the combinations of the two first reference holes 62. In other words, the second reference hole 63A is provided between the combination of the two first reference hole 62A and the first reference hole 62B. Likewise, the second reference hole 63B is provided between the two first reference hole 62B and the first reference hole 62C. In this embodiment, the second reference holes 63 (63A, 63B) are disposed upon a straight line that connects a combination of the two first reference holes 62. Meanwhile, the second reference hole 63B has an oval shape (that is, a long-hole shape) that is longer in the direction that connects the combination of the two first reference holes 62. Although details will be given later, as a result, when flexible portions 65 in which the second reference holes 63 are provided are stretched, the positioning of the communication openings 61 by the second reference holes 63 can be carried out without the degree of the stretching of the flexible portions 65 being limited by the reference pins inserted into the second reference holes 63.

Reinforced portions 64 and the flexible portions 65 are provided in this sealing member 60, in which the plurality of reference holes 62 and 63 are provided.

Here, "reinforced portions 64" refers to areas that are stronger than the flexible portions 65. Such reinforced portions 64 can be formed by increasing the cross-sectional surface area beyond that of the flexible portions 65, such as by increasing the thickness beyond the thickness of the flexible portions 65, increasing the width beyond the width of the flexible portions 65, and so on. Of course, the reinforced portions 64 may be both thicker and wider than the flexible portions 65.

The "flexible portions 65" refers to areas that are weaker than the reinforced portions 64, or in other words, have a lower degree of strength in the reinforced portions 64. Such flexible portions 65 can be formed by reducing the cross-sectional surface area beyond that of the reinforced portions 64, such as by reducing the thickness beyond the thickness of the reinforced portions 64, reducing the width beyond the width of the reinforced portions 64, and so on. Of course, the flexible portions 65 may be both thinner and narrower than the reinforced portions 64. In other words, the reinforced portions 64 and the flexible portions 65 refer to areas that have strengths that are relative to each other. Accordingly, as long as the relative relationship between the reinforced portions 64 and the flexible portions 65 corresponds to that described above, other portions may be present as well. A sealing member 60 that is configured of three portions, or a base area that has a standard thickness (width), the reinforced portions 64 having a thickness (wide width) that is greater than the base area, and the flexible portions 65 having a thickness (narrow width) that is less than the base area, can be given as an example of such a sealing member 60 that includes other areas. In this embodiment, portions that are thinner than the reinforced portions 64 are provided as the flexible portions 65. Furthermore, in this embodiment, the second reference holes 63 are provided in the flexible portions 65. As the second reference holes 63 are provided in this manner, the cross-sectional surface area of the flexible portions 65 is less than that of the reinforced portions 64.

In this embodiment, the reinforced portions 64 are formed in regions in which the communication openings 61 are formed, or in other words, the communication openings 61 are formed in the reinforced portions 64.

Meanwhile, the flexible portions 65 are provided between the combinations of the two first reference holes 62. In other words, the flexible portions 65 are disposed upon a straight line that connects the combination of the two first reference holes 62. As a result, in each long portion, the reinforced portions 64 and the flexible portions 65 are disposed in an alternating manner. By providing the communication openings 61 in the reinforced portions 64 and providing the flexible portions 65 between the communication openings 61 (that is, between the reinforced portions 64), it is possible to purposely stretch the flexible portions 65 and suppress the reinforced portions 64 from stretching (details will be given later). Accordingly, it is possible to suppress the communication openings 61 from deforming or shifting positions as a result of the reinforced portions 64 stretching. Note that in this embodiment, one of the first reference holes 62 that is part of an additional combination of two reference holes 62 is provided in each of the reinforced portions 64. This one first reference hole 62 is formed in the same reinforced portion 64 as the communication opening 61 that is to be positioned. As a result, because it is difficult for the reinforced portions 64 to stretch, it is possible to suppress the distance between the first reference holes 62 and the communication openings 61 from expanding, and it is thus possible to position the first reference holes 62 with a high degree of precision.

Incidentally, the two long portions in which the reinforced portions 64 and the flexible portions 65 are disposed in an alternating manner are provided so as to be connected at both ends in the lengthwise direction, so as to form a ring shape. If the areas at both ends in the lengthwise direction, where the long portions are connected, have a high degree of strength, as is the case with the reinforced portions 64, it is difficult for the two long portions to stretch when positioning those long portions relative to the main head unit 20, the self-sealing unit 30, and so on; as a result, it is not possible to absorb the tolerance of the main head unit 20, the self-sealing unit 30, and so on, which makes the positioning difficult. Accordingly, in this embodiment, the width of the areas where the ends of the two long portions connect to each other is reduced to a width that is less than that of the reinforced portions 64 and the flexible portions 65, thus reducing the cross-sectional surface area beyond that of the reinforced portions 64; this results in extending areas 66 that stretch with the ease, in the same manner as the flexible portions 65.

Here, the positioning of the communication openings 61A and 61B using the reference holes 62 and 63, the reinforced portions 64, and the flexible portions 65 will be described further with reference to FIGS. 8A and 8B and FIG. 9. Note that the positioning of the other communication openings 61C and 61D is carried out in the same manner, and therefore redundant descriptions will be omitted.

Of the combination of the two first reference holes 62A and 62B provided in the sealing member 60, the first reference hole 62A is provided in the same reinforced portion 64 as the communication opening 61A, and is provided closest to the communication opening 61A. The distance of the communication opening 61A from the first reference hole 62A is determined by inserting the reference pin 70 into the first reference hole 62A. In other words, the distance from the first reference hole 62A to the communication opening 61A is set with a high degree of precision.

In addition, as mentioned above, the first reference hole 62A and the communication opening 61A are provided in the same reinforced portion 64. Accordingly, because it is difficult for the reinforced portions 64 to stretch, it is difficult for error to occur in the distance from the first reference hole 62A to the communication opening 61A.

Meanwhile, the other first reference hole 62B limits the direction of the communication opening 61A relative to the first reference hole 62A as a result of the first reference hole 62A that limits the distance relative to the communication opening 61A. In other words, the distance and planar direction relative to the first reference hole 62A, which take the communication opening 61A as a reference, are determined by inserting the reference pins 70, which are anchored to the main head unit 20, the self-sealing unit 30, and so on, into the respective first reference holes 62A and 62B. At this time, there are cases where the positions of the reference pins 70 that are anchored to the main head unit 20, the self-sealing unit 30, and so on shift due to the tolerance of the main head unit 20, the self-sealing unit 30, and so on, resulting in the positions of the two reference pins 70 distancing from each other. Of course, the positions of the first reference holes 62A and 62B in the sealing member 60 also shift due to the tolerance. Accordingly, by providing the flexible portion 65 between the combination of the two first reference hole 62A and the first reference hole 62B, even if the sealing member 60 is pulled by the reference pins 70 that are inserted into the two first reference holes 62A and 62B, the flexible portion 65 is purposely stretched; as a result, it is possible to suppress the reinforced portions 64 from stretching, and suppress the distance of the communication opening 61A from the first reference hole 62A from shifting. In addition, because the flexible portions 65 stretch more easily than the reinforced portions 64 and the reinforced portions 64 are inherently unlikely to stretch, the size and shape of the communication opening 61A provided in the reinforced portion 64 is unlikely to change even if the sealing member 60 stretches. As a result, it is possible to suppress a change in the position (distance) of the communication opening 61A that takes the first reference hole 62A as a reference.

Note that the flexible portions 65 are formed so as to stretch in a uniform manner. Here, the flexible portions 65 stretching "in a uniform manner" corresponds to extending symmetrically along an axis corresponding to the direction of a straight line that connects the two first reference holes 62A and 62B. In this embodiment, the second reference hole 63A is provided in the flexible portion 65, and the portions provided on both sides of the second reference hole 63A (that is, in the widthwise direction of the sealing member 60 and the direction orthogonal to the direction in which the four communication openings 61 are arranged) stretch by the same amount per unit of pulling force and are disposed in positions that are symmetrical taking the direction of a straight line that connects the two first reference holes 62A and 62B as the axis; accordingly, the areas on both sides of the second reference hole 63A stretch in a uniform manner. When the flexible portions 65 stretch symmetrically taking the direction of a straight line that connects the two first reference holes 62A and 62B as the axis in this manner, it is possible to increase the precision of the position of the communication opening 61A that is limited by the two first reference holes 62A and 62B. Incidentally, even if the flexible portions 65 do not stretch symmetrically taking the direction of a straight line that connects the two first reference holes 62A and 62B as the axis, the second reference hole 63 is provided between the two first reference holes 62A and 62B in this embodiment, which makes it possible to position the communication opening 61A with a high degree of precision having corrected such asymmetrical stretching.

Specifically, as shown in FIG. 8A, if the reference pins 70 are simply inserted into the two first reference holes 62A and 62B, there is a risk that the space between the two reference pins 70 (the first reference holes 62A and 62B) will warp and bend, with the two reference pins 70 acting as the axis, at unforeseen timings due to sideways pressure. If the area between the two first reference holes 62A and 62B bends in this manner, the position of the communication opening 61A will shift from the position obtained through the positioning, leading to ink leaks at the connections to the main head unit 20 and the self-sealing unit 30, bubbles accumulating due to nonplanarities within the flow channel in the sealing member 60, and so on. Of course, as described above, the sealing member 60 may also bend at the area between the two first reference holes 62A and 62B due to imbalances in the stretching of the flexible portions 65.

Accordingly, in this embodiment, the second reference hole 63A is provided between the two first reference holes 62A and 62B, and as shown in FIGS. 8B and 9, a reference pin 71 is inserted into the second reference hole 63A; this suppresses the area of the sealing member 60 between the two first reference holes 62A and 62B from bending, and makes it possible to position the communication opening 61A with a high degree of precision.

In other words, the second reference hole 63A can suppress the area between the two first reference holes 62A and 62B, which corresponds to the long portion, from bending, suppress imbalances in the stretching of the flexible portions 65, and thus enable the communication opening 61A to be positioned with a high degree of precision. Incidentally, in this embodiment, the second reference hole 63A is disposed upon a straight line that connects the two first reference holes 62A and 62B. Accordingly, the second reference hole 63A has an oval shape (a long-hole shape) whose lengthwise axis corresponds to the direction of the line that connects the first reference holes 62A and 62B. As a result, the second reference hole 63A can suppress the stretching of the flexible portions 65 from being limited, and movement of the sealing member 60 in the direction of the stated bending can be limited with certainty using the second reference hole 63A.

Furthermore, the communication opening 61B is also provided between the two first reference holes 62A and 62B. The first reference hole 62B is provided in the same reinforced portions 64 as the communication opening 61B, and is provided closest to the communication opening 61B. The distance of the communication opening 61B from the first reference hole 62B is determined by inserting the reference pin 70 into the first reference hole 62B. In other words, the distance from the first reference hole 62B to the communication opening 61B is set with a high degree of precision.

The distance of the communication opening 61B from the first reference hole 62B is determined by the first reference hole 62B, and the direction based on the first reference hole 62B is determined by the first reference hole 62A. Furthermore, when positioning the communication opening 61B, the flexible portions 65 stretch and absorb the tolerance of the reference pins 70, the second reference hole 63A limits the bending of the sealing member 60, and the communication opening 61B is positioned with a high degree of precision, in the same manner as described earlier. In other words, the two first reference holes 62A and 62B can position the two communication openings 61A and 61B provided therebetween with a high degree of precision. Incidentally, the same effects can be achieved even if only a single communication opening 61 is provided between the two first reference holes 62A and 62B; however, if only the positioning of the single communication opening 61 is carried out using the two first reference holes 62A and 62B, and if the two first reference holes 62A and 62B are provided close to each other, stretching and bending due to the tolerance can be suppressed, and thus the flexible portions 65, the second reference holes 63, and so on are unnecessary. In the case where a plurality of communication openings 61 (61A and 61B) are provided in the long portion, as in this embodiment, it is necessary to provide the two first reference holes 62A and 62B in comparatively distanced positions (that is, close to the communication openings 61), and thus in the case where the first reference holes 62A and 62B have been provided in comparatively distanced positions in this manner, the flexible portions 65 and the second reference hole 63A are provided, which makes it possible to position the plurality of communication openings 61A and 61B with a high degree of precision.

In this manner, with the sealing member 60 according to this embodiment, the sealing member 60, which is provided with a plurality of communication openings 61, can be positioned relative to the communication openings 61 with a high degree of precision using the combination of the two first reference holes 62 and the second reference holes 63. In addition, by providing the reinforced portions 64 and the flexible portions 65, it is possible to absorb the tolerance when the components are manufactured due to the flexible portions 65 stretching, and positional shifting and deformation in the communication openings 61 can be suppressed by making it difficult for the reinforced portions 64 to stretch; this makes it possible to position the communication openings 61 with a high degree of precision. Accordingly, it is possible to suppress ink leaks at the connections to the main head unit 20 and the self-sealing unit 30, bubbles accumulating due to nonplanarities within the flow channel in the sealing member 60, and so on.

OTHER EMBODIMENTS

Although an embodiment of the invention has been described in detail thus far, the invention is of course not limited to the aforementioned embodiment. For example, although the communication openings 61A and 61B are provided between the two first reference holes 62A and 62B in the above first embodiment, the invention is not particularly limited thereto, and the communication openings 61A and 61B may instead be provided outside the area between the two first reference holes 62A and 62B. For example, the communication opening 61A may be provided on the opposite side of the first reference hole 62A as the first reference hole 62B. As shown in FIG. 8A, the communication openings 61 provided between the two first reference holes 62 are significantly affected caused by the positional shifting due to the area of the sealing member 60 between the two first reference holes 62 bending; however, the communication openings 61 provided on the outside of the two first reference holes 62 are affected less by the bending of the area between the two first reference holes 62. Accordingly, although this invention provides particularly significant effects for a configuration in which the communication openings 61 are provided between the two first reference holes 62, such effects can also be achieved when the communication openings 61 are provided on the outside of the area between the first reference holes 62. In addition, the communication opening 61A may be provided in a position that is shifted in the direction intersecting with a straight line that connects the two first reference holes 62.

Figure 10:
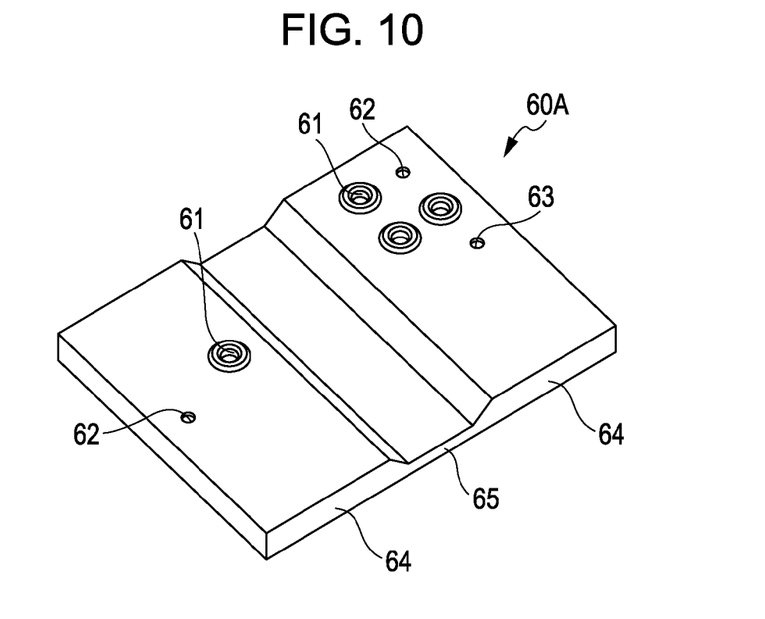
FIG. 10 is a perspective view illustrating a sealing member according to another embodiment of the invention.

Furthermore, although the above first embodiment describes the second reference holes 63 (63A, 63B) as being provided between the two first reference holes 62A and 62B and upon a straight line that connects the two first reference holes 62A and 62B, the second reference holes 63 (63A, 63B) need not be provided upon a straight line as long as the second reference holes 63 (63A, 63B) are provided between the two first reference holes 62A and 62B. Of course, the communication openings 61, the flexible portions 65, and so on also need not be provided upon a straight line as long as those elements are provided between the two first reference holes 62A and 62B. An example of this will be given with reference to FIGS. 10 and 11. FIG. 10 is a perspective view illustrating a variation on the sealing member according to another embodiment of the invention, whereas FIG. 11 is a plan view illustrating the variation on the sealing member according to the other embodiment.

Figure 11:
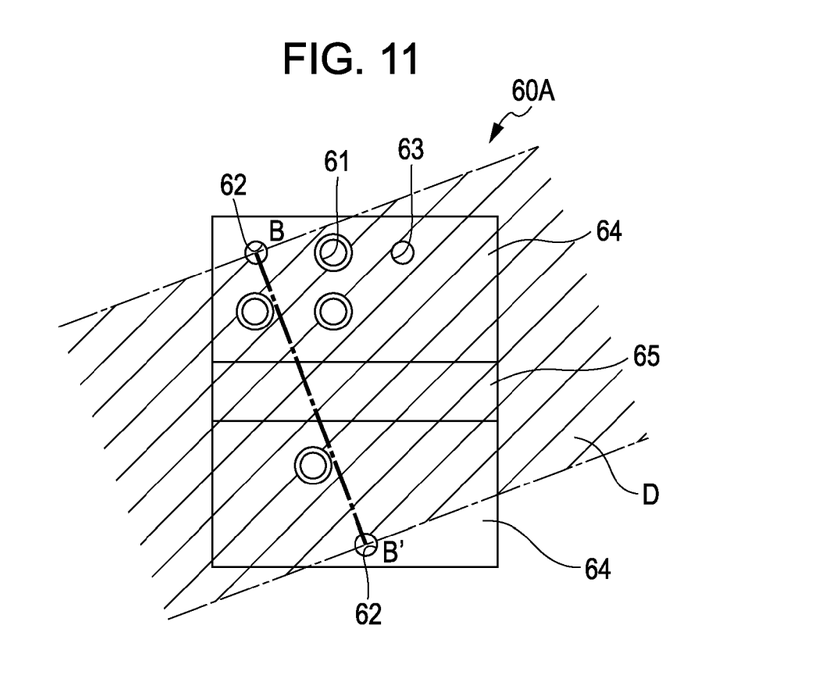
FIG. 11 is a plan view illustrating a sealing member according to another embodiment of the invention.

As shown in FIGS. 10 and 11, a sealing member 60A includes two reinforced portions 64 and a flexible portion 65, which is thinner than the reinforced portions 64, provided between the two reinforced portions 64.

One of the first reference holes 62 and one of the communication openings 61 are provided in one of the reinforced portions 64. Meanwhile, one of the first reference holes 62, three communication openings 61, and a single second reference hole 63 are provided in the other of the reinforced portions 64.

The second reference hole 63 is provided between the two reference holes 62, in a direction that is orthogonal to the direction of a straight line that connects the two reference holes 62. Likewise, the four communication openings 61 are provided between the two reference holes 62, in a direction that is intersecting with the direction of a straight line that connects the two reference holes 62.

The distances, from the first reference holes 62, of the communication openings 61 provided in the respective reinforced portions 64 are determined by the first reference holes 62 provided in the same reinforced portions 64. In addition, the direction, based on the first reference hole 62 provided in one of the reinforcing members 64, of the communication openings 61 provided in the one of the reinforced portions 64 is limited by the first reference hole 62 provided in the other reinforced portion 64.

Even if the sealing member is configured in this manner, the distance and direction of the three communication openings 61 is determined by the two first reference holes 62, in the same manner as in the aforementioned first embodiment. At this time, shifting caused by the tolerance of the positions of the reference pins that are inserted into the two first reference holes 62 is absorbed by the flexible portion 65. In addition, bending in the direction intersecting with the straight line that connects the two first reference holes 62 of the sealing member 60A is limited by the reference pin that is inserted into the second reference hole 63. Through this, the plurality of communication openings 61 can be positioned with a high degree of precision. In other words, the communication openings 61, the second reference hole 63, and the flexible portion 65 being provided between the first reference holes 62 corresponds not only to those elements being disposed upon a straight line that connects the two first reference hole 62, but also to those elements being provided in a region D orthogonal to a B-B' line that connects the two first reference holes 62 and provided at the width of the B-B' line, as shown in FIG. 11.

In addition, although the above first embodiment describes an example in which a plate-shaped member having a ring shape that includes the opening 69 into which the main head unit 20 is inserted is used as the sealing member 60, the sealing member 60 may have a shape such as that in this embodiment, created by combining a plurality of sealing members. However, using a plate-shaped sealing member 60 configured of a single ring shape, as in the aforementioned first embodiment, makes it possible to reduce the number of components as well as reduce costs by reducing the number of steps required to carry out the positioning.

Furthermore, although the self-sealing unit 30 is given as an example of a head holder in the aforementioned embodiments, the head holder is not particularly limited thereto. For example, although a self-sealing unit 30 provided with a valve member is described as an example of the head holder in the aforementioned embodiments, the head holder may instead be a flow channel member that includes the second liquid flow channel but is not provided with a valve member.

Although the aforementioned embodiments describe a configuration in which a sealing member is disposed between the self-sealing unit 30, which is an example of a head holder, and the main head unit 20, this is nothing more than an example; the invention can be applied regardless of the location of the sealing member as long as the configuration is such that the sealing member is disposed between an ink cartridge and the main head unit 20. In other words, the technique described in this invention can be applied to a sealing member regardless of which area between the ink cartridge and the main head unit 20 the sealing member is disposed.

Furthermore, although the aforementioned embodiment describes an ink jet recording head as an example of a liquid ejecting head, the invention is targeted at liquid ejecting heads widely in general, and thus can of course be applied in liquid ejecting heads that eject liquids aside from ink. Various types of recording heads used in image recording apparatuses such as printers, coloring material ejecting heads used in the manufacture of color filters for liquid-crystal displays and the like, electrode material ejecting heads used in the formation of electrodes for organic EL displays, FEDs (field emission displays), and so on, bioorganic matter ejecting heads used in the manufacture of biochips, and so on can be given as other examples of liquid ejecting heads. Further still, the invention is not limited to sealing members used in liquid ejecting heads exemplified by ink jet recording heads, and can be applied in all other sealing members that are interposed between two members having liquid flow channels.

What is claimed is:

1. A sealing member disposed between a first member in which a first liquid flow channel is provided and a second member in which a second liquid flow channel that communicates with the first liquid flow channel is provided, the sealing member comprising:
    a plurality of communication openings;
    a reinforced portion in which the communication openings are provided;
    at least two first reference holes;
    a flexible portion, provided between the two first reference holes, that is weaker than the reinforced portion; and
    a second reference hole provided between the two first reference holes.

2. The sealing member according to claim 1, wherein the communication openings are provided between the two first reference holes.

3. The sealing member according to claim 1, wherein the first reference holes are provided for each of the communication openings.

4. The sealing member according to claim 1, wherein the second reference hole is provided in the flexible portion.

5. The sealing member according to claim 1, wherein the communication openings are disposed upon a straight line that connects the two first reference holes.

6. The sealing member according to claim 1, wherein the second reference hole is disposed upon a straight line that connects the two first reference holes.

7. The sealing member according to claim 1, wherein the diameter of the first reference holes is less than or equal to the maximum diameter of reference pins inserted into the first reference holes.

8. A liquid ejecting head comprising: the sealing member according to claim 1;
    a main liquid ejecting head unit, in which is formed the first liquid flow channel that ejects the liquid from a nozzle opening using a pressurizing unit; and
    a head holder including the second liquid flow channel, one end of the second liquid flow channel communicating with a reservoir member that holds the liquid and the other end of the second liquid flow channel communicating with the first liquid flow channel.

9. A liquid ejecting apparatus comprising: the liquid according to claim 8.

* * * * *